United States Patent
Anglin et al.

(10) Patent No.: US 8,209,298 B1
(45) Date of Patent: Jun. 26, 2012

(54) RESTORING A RESTORE SET OF FILES FROM BACKUP OBJECTS STORED IN SEQUENTIAL BACKUP DEVICES

(75) Inventors: Matthew J. Anglin, Tucson, AZ (US); David M. Cannon, Tucson, AZ (US); Avishai H. Hochberg, San Jose, CA (US); David G. Van Hise, Tucson, AZ (US); Mark L. Yakushev, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/972,291

(22) Filed: Dec. 17, 2010

(51) Int. Cl.
*G06F 17/30* (2006.01)

(52) U.S. Cl. ........ 707/674; 707/610; 707/640; 707/661; 707/687; 707/705

(58) Field of Classification Search ........... 707/600–831
See application file for complete search history.

(56) References Cited

U.S. PATENT DOCUMENTS

| | | | |
|---|---|---|---|
| 6,415,300 B1 | 7/2002 | Liu et al. | |
| 6,804,690 B1 | 10/2004 | Dysert et al. | |
| 6,938,180 B1 | 8/2005 | Dysert et al. | |
| 7,634,627 B1 | 12/2009 | Ohr et al. | |
| 7,953,945 B2 * | 5/2011 | Bender et al. | 711/161 |
| 2009/0210640 A1 | 8/2009 | Davis | |

OTHER PUBLICATIONS

U.S. Appl. No. 12/719,108, filed Mar. 8, 2010, entitled "Approach for Optimizing Restores of Deduplicated Data".

U.S. Appl. No. 12/504,083, filed Jul. 16, 2009, entitled "An Integrated Approach for Deduplicating Data in a Distrubuted Environment That Involves a Source and a Target".

U.S. Patent Application, entitled "Restoring Data Objects From Sequential Backup Devices", invented by M. Anglin, D. Cannon, A. Hochberg, and M. Yakushev.

* cited by examiner

*Primary Examiner* — Isaac M Woo
(74) *Attorney, Agent, or Firm* — David W. Victor; Konrad Raynes and Victor LLP (57) ABSTRACT

Provided are a computer program product, system, and method for restoring a restore set of files from backup objects stored in sequential backup devices. Backup objects are stored in at least one sequential backup device. A client initiates a restore request to restore a restore set of data in a volume as of a restore point-in-time. A determination is made of backup objects stored in at least one sequential backup device including the restore set of data for the restore point-in-time, wherein the determined backup objects are determined from a set of backup objects including a full volume backup and delta backups providing data in the volume at different points-in-time, and wherein extents in different backup objects providing data for blocks in the volume at different points-in-time are not stored contiguously in the sequential backup device. A determination is made of extents stored in the at least one sequential backup device for the determined backup objects. The determined extents are sorted according to an order in which they are stored in the at least one sequential backup device to generate a sort list. The extents are retrieved from the at least one sequential backup device according to the order in the sort list to access the extents sequentially from the sequential backup device in the order in which they were stored. The retrieved extents are returned to the client and the client reconstructs the restore data set from the received extents.

25 Claims, 7 Drawing Sheets

FIG. 1

Volume Backup Info

FIG. 2

Backup Object Information

FIG. 3

File Index Entry

| Extent | Backup Device | Device Storage Location |
|---|---|---|
| J | 3 | 0 |
| F | 2 | 8192 |
| D | 2 | 8388608 |
| H | 2 | 2097152 |
| C | 1 | 1024 |
| G | 1 | 5218304 |

Extent Info

RESTORING A RESTORE SET OF FILES FROM BACKUP OBJECTS STORED IN SEQUENTIAL BACKUP DEVICES

BACKGROUND OF THE INVENTION

1. Field of the Invention

The present invention relates to a computer program product, system, and method for restoring a restore set of files from backup objects stored in sequential backup devices.

2. Description of the Related Art

In a network backup environment, client systems back-up their data in backup objects to a backup server over a network. The backup server maintains a database of backup objects providing information on stored backup objects. The client systems may restore files from the backup objects maintained by the backup server. The backup objects for a volume include a full volume backup object as of an initial point-in-time and delta backups that capture changes to the volume as of the initial point-in-time at different points-in-time. A full volume backup may be comprised of one object that represents the entire volume or comprised of multiple objects. The delta backups may comprise an incremental backup or differential backup. An "incremental backup" at a point-in-time comprises a backup object having files or blocks that have changed between the point-in-time of the last taken incremental backup or full volume backup, whichever is more recent, and the point-in-time of the incremental backup. A "differential backup" comprises a backup taken of a volume as of a point-in-time of the last full volume backup, so a differential backup set has all files or blocks that have changed between the point-in-time of the differential backup and the last full volume backup.

Tivoli Storage Manager (TSM) FastBack® is an example of a system that performs block level incremental backups. Other examples include image backup of a file system by a TSM client and FlashCopy® Manager, in which a local hardware snapshot is created and later backed up to a Tivoli Storage Manager server. (Tivoli Storage Manager FastBack and FlashCopy are registered trademarks of International Business Machines Corp. in the United States and other countries). In addition to incremental and differential backups, deduplication can be applied to further reduce the backup repository storage requirements.

The backup client and server may implement data deduplication, which removes redundant data during a backup operation to optimize storage space and conserve network bandwidth. The backup operation may back-up data in chunks or extents of data, such that if multiple backup objects share the same extent, then only one instance of the extent is stored in backup storage.

Deduplication during storage backup activities can be performed at the data source (client), data target (server), or on a deduplication appliance connected to the backup server. The restoration of deduplicated data from the server to the client involves reconstruction of the data from deduplicated chunks or extents. In current systems, the deduplicated data is stored on disk, and the backup server will access the extents for backup objects to restore from the disk, and then return full backup objects to the client, including objects that have common extents. Even if the same extent is found in many backup objects (or even in the same object) selected for restore, that chunk or extent will be restored and transmitted from the server to the client multiple times. The backup server may access the extents from disk in any order due to the random access nature of the disk-based storage.

An operation to restore data from the backup objects may require applying data from a full and associated incremental or differential backups (which may have been deduplicated). The restore process involves reconstruction of the client image which can become fragmented in the backup repository due to a number of possible data transformations and placement location in the backup repository. For instance, the source client image can be broken into multiple objects in the backup repository (e.g. breaking a 0.5 TB volume into 1 GB backup objects). These objects could span multiple volumes (disk or tape) in the backup repository. For incremental or differential point-in-time backups, each point-in-time backup could be on different volumes (disk or tape) in the backup repository. Further, performing deduplication of the source client image may result in deduplicated chunks of a source image existing on multiple volumes (disk or tape) in the backup repository. The server backup program may have management operations that move, expire or reclaim data. These operations could result in changing the order of objects or extents on sequential-access media.

There is a need in the art for improved techniques for handling the restoration of backup objects in different storage environments.

SUMMARY

Provided are a computer program product, system, and method for restoring a restore set of files from backup objects stored in sequential backup devices. Backup objects are stored in at least one sequential backup device. A client initiates a restore request to restore a restore set of data in a volume as of a restore point-in-time. A determination is made of backup objects stored in at least one sequential backup device including the restore set of data for the restore point-in-time, wherein the determined backup objects are determined from a set of backup objects including a full volume backup and delta backups providing data in the volume at different points-in-time, and wherein extents in different backup objects providing data for blocks in the volume at different points-in-time are not stored contiguously in the sequential backup device. A determination is made of extents stored in the at least one sequential backup device for the determined backup objects. The determined extents are sorted according to an order in which they are stored in the at least one sequential backup device to generate a sort list. The extents are retrieved from the at least one sequential backup device according to the order in the sort list to access the extents sequentially from the sequential backup device in the order in which they were stored. The retrieved extents are returned to the client and the client reconstructs the restore data set from the received extents.

DETAILED DESCRIPTION

A backup server stores extents from multiple backup objects in sequential-access devices. In deduplication embodiments, one instance of each extent is backed-up for extents included in multiple backup objects or at multiple locations within the same backup object. Restoration of data from sequential-access media (such as magnetic tape) requires time to mount cartridges and position the device reader to the data extents. Sequential-access media comprises storage where data locations must be accessed in a sequential manner. Further, backup data can become non-contiguous because the files backed-up may be defragmented and because the same data presented in different backup objects as of different points-in-time are stored non-contiguously. In the prior art, a restore operation of non-contiguous data from sequential-access media would require multiple volume mount and seek operations thus resulting in poor access performance. The described embodiments provide improved performance and efficient techniques to restore backup data from sequential-access media. To allow a client to restore files from backup objects from extents backed-up in sequential-access media with deduplication, the backup server accesses the extents including the files to restore from the sequential-access device in the order in which the extents are stored across the sequential backup devices and returns the extents to the client to use to restore the files.

Figure 1:
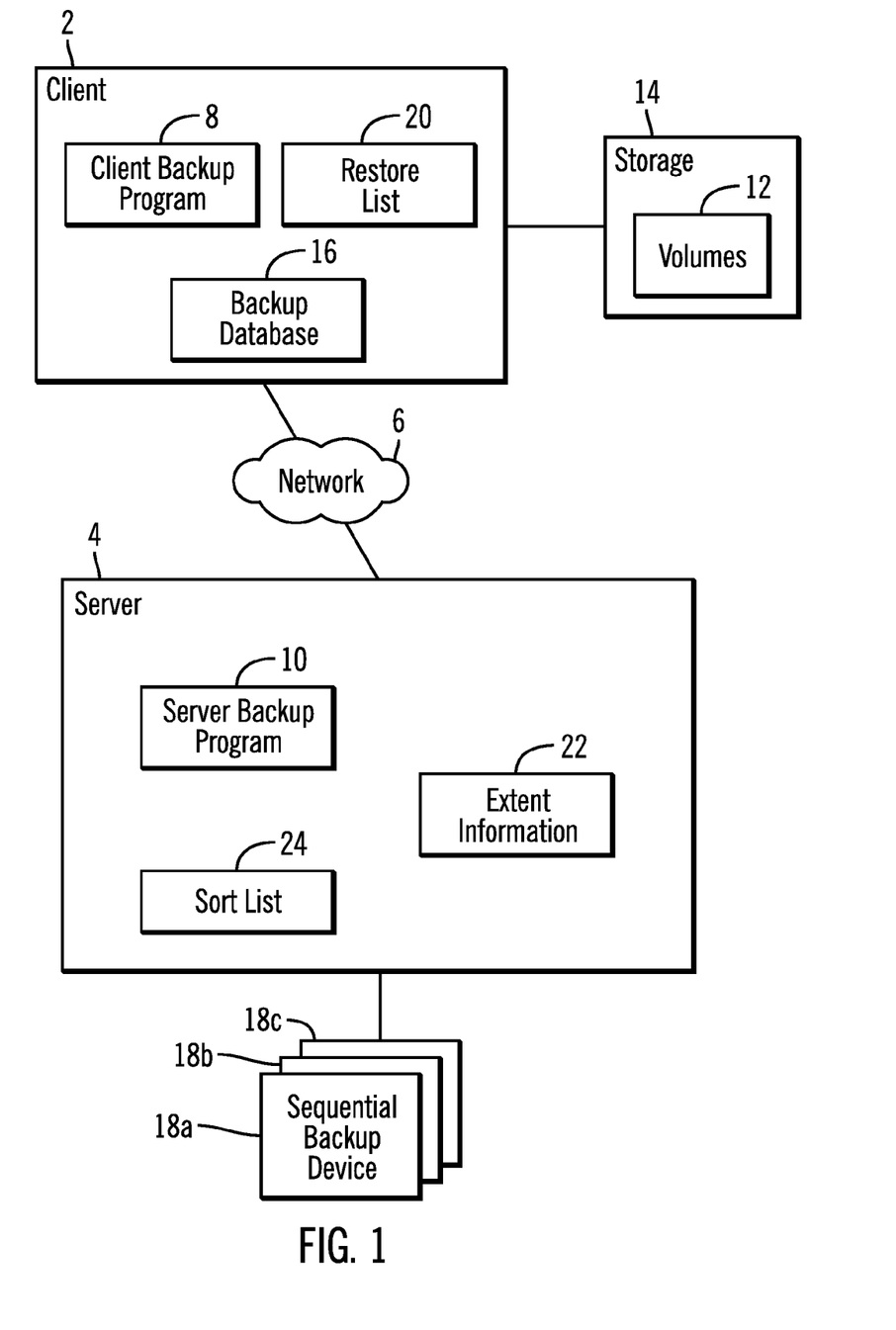
FIG. 1 illustrates an embodiment of a network backup environment.

FIG. 1 illustrates an embodiment of a network backup environment. The environment includes a client system 2 and server system 4 that communicate over a network 6. The client 2 and server 4 include a client backup program 8 and server backup program 10, respectively, to perform client-server backup related operations to provide backup services for the client 2, including backing-up volumes 12 maintained by the client 2 in local storage 14. Although one client 2 is shown, the server 4 may provide backup services for multiple client systems over the network 6. The term "backup" as used herein refers to other backup related operations, such as archive and space management operations. Further, the backup and restore operations may be performed with respect to an entire volume or a subset of files on the volume. References herein with respect to backup and restore operations for a volume refer to backup and restore operations with respect to the entire volume or a subset of files and objects in the volume.

The client backup program 8 maintains a backup database 16 providing information on backups of the volumes 12 at different points-in-time from the client 2 in one or more sequential backup devices 18a, 18b, 18c. Sequential backup devices 18a, 18b, 18c comprise sequential-access devices in which data is sequentially read from and written to physically sequential storage locations, such as magnetic tape media or other sequential access devices in which the media needs to be mounted and seek operations are performed to move the read head to a track location on the sequential access media.

To restore a restore set comprising an entire volume or subset of a volume as of a restore point-in-time, the client backup program 8 determines backup objects having backup data for the restore files and extents comprising the restore files in the backup objects to generate a restore list 20 indicating extents for files to restore from the sequential backup devices 18a, 8b, 18c and return to the client 2. A restore set to restore may comprise an entire volume, file system or subset of files. Further, references herein to a volume or subset of files on the volume also apply to a file system and a subset of files in the file system.

The server backup program 10 maintains extent information 22 indicating a location of extents in the backup objects to restore in the sequential backup devices 18a, 18b, 18c, and a sort list 24 indicating an order in which extents from the sequential backup devices 18a, 18b, 18c are to be retrieved and returned to the client 2. In certain embodiments, when the client backup program 8 receives extents from the server backup program 10, the client backup program 8 may immediately restore files from the restore set from the received extents.

In certain embodiments, when restoring multiple files, the client backup program 8 may make a restored file available when the restoration is completed even if other files in the restore request have not been completely restored. The client backup program 8 may not permit access to a backup object being restored until all extents are included to prevent access to partially restored files. If the restoration fails, then the client backup program 8 may remove the partially restored file to prevent access to a file only partially restored. Alternatively, the client backup program 8 may buffer extents received from the server backup program 10 for backup objects to restore.

To prevent the use of partially restored data objects, a data object that is in the process of being restored may be renamed, such as with an extension ".TMP" added to the file name. Alternatively, a data object being restored may be reconstructed in a staging directory from which the data object is not accessible until the data object is fully reconstructed and returned to the active directory in which it is accessible. In a yet further embodiment, a data object being reconstructed may be configured with a special permission indicating that it is not available for access by applications.

An extent comprises a chunk or block of data assigned to a backup object, such that a backup object may be configured to include one or more extents. A backup object may comprise a file, a database, a file system, or any other grouping of data.

The network 6 may comprise a Local Area Network (LAN), Storage Area Network (SAN), Wide Area Network (WAN), wireless network, etc. The client 2 and server 4 may comprise an enterprise storage server, storage controller, blade server, general purpose server, desktop computer, workstation, telephony device, personal digital assistant (PDA), etc., or other computing device.

The storage 14 may comprise storage media implemented in one or more storage devices known in the art, such as interconnected hard disk drives (e.g., configured as a DASD, RAID, JBOD, etc.), solid state storage devices (e.g., EEPROM (Electrically Erasable Programmable Read-Only Memory), flash memory, flash disk, storage-class memory (SCM)), electronic memory, etc. The sequential backup devices 18a, 18b, 18c comprise a storage device or element where data can only be accessed (read or written) in a predetermined, ordered sequence, such as magnetic tape media, sequential-access memory (SAM), etc.

The server 4 may be implemented in a distributed storage environment or network storage environment, such as "cloud" storage, to provide backup services to clients 2 in the cloud. Alternatively, the client 2 and server 4 may comprise software or a combination of software and hardware components in a same system, such as separate programs executing in a same memory.

Figure 2:
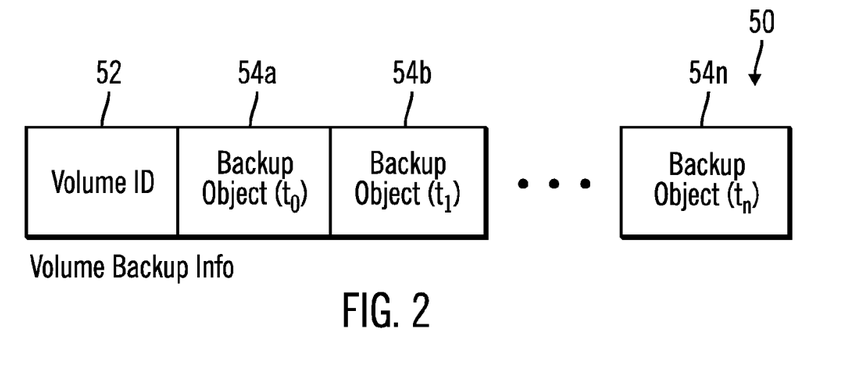
FIG. 2 illustrates an embodiment of volume backup information.

FIG. 2 illustrates volume backup information maintained in the backup database 16 of backup objects created for a volume at different points-in-time. Volume backup information 50 includes a volume identifier (ID) 52 identifying a volume 12 and multiple backup objects 54a, 54b ... 54n of the volume 52 created at different points-in-time $t_0, t_1 \ldots t_n$. In one embodiment, the first backup object 54a taken at time $t_0$ comprises a full backup of the entire volume 52. Each subsequent backup object 54b ... 54n taken at subsequent points-in-time $t_1 \ldots t_n$ comprise delta backups of the volume. A delta backup comprises either an incremental backup or a differential backup.

Figure 3:
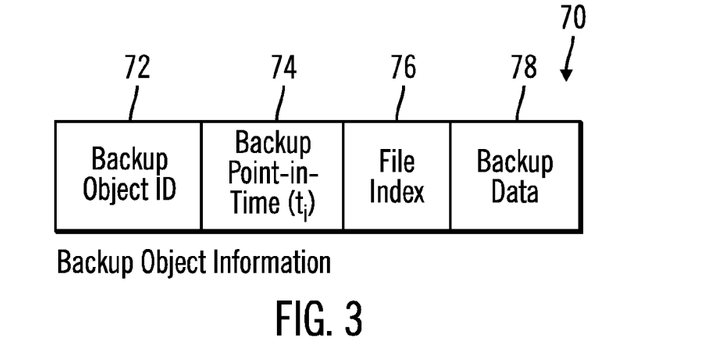
FIG. 3 illustrates an embodiment of backup object information.

FIG. 3 illustrates an embodiment of backup object information 70 maintained in the backup database 16, where an instance of the backup object information 70 is maintained for each backup object managed in the backup database 16. The backup object information 70 provides tracking at a file level. Backup object information 70 includes a backup object identifier 72, a backup point-in-time ($t_i$) 74 of the point-in-time ($t_i$) of the volume when the backup object was created, a file index 76 indicating the files of the volume for which data is provided in the backup object 72, and backup data 78 comprising the backup data or a location of the backup data. For a delta backup object, the file index 76 would indicate those files that have changed since the previous point-in-time for the backup, which is the point-in-time of the full volume backup or a point-in-time of the last delta backup.

Figure 4:
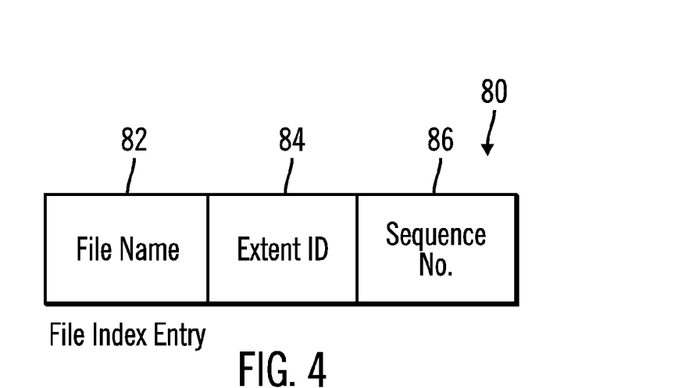
FIG. 4 illustrates an embodiment of a file index entry in a file index for the backup object information.

FIG. 4 illustrates an embodiment of a file index entry 80 maintained in the file indexes 76 for the backup objects. The file index entry 80 tracks data at a sub-file (extent) level. A file index entry 80 includes a file name 82 providing a unique identifier of a file in the volume, an extent ID 84 identifying an extent within the file 82, and a sequence number 86 indicating the sequence number of the extent 84 within the file 82. For each of the extents comprising the file 82 represented by the file index entry 80, there is an extent ID 84 and corresponding sequence number 86. If the same extent occurs at multiple locations within the same file, then there will be multiple file index entries 80 for the same extent ID 84 having different sequence numbers 86, one for each instance of the extent 84 in the file.

In certain embodiments, the server backup program 10 sends the backup object information 70 and the file index entries 80 to the client backup program 8.

Figure 5:
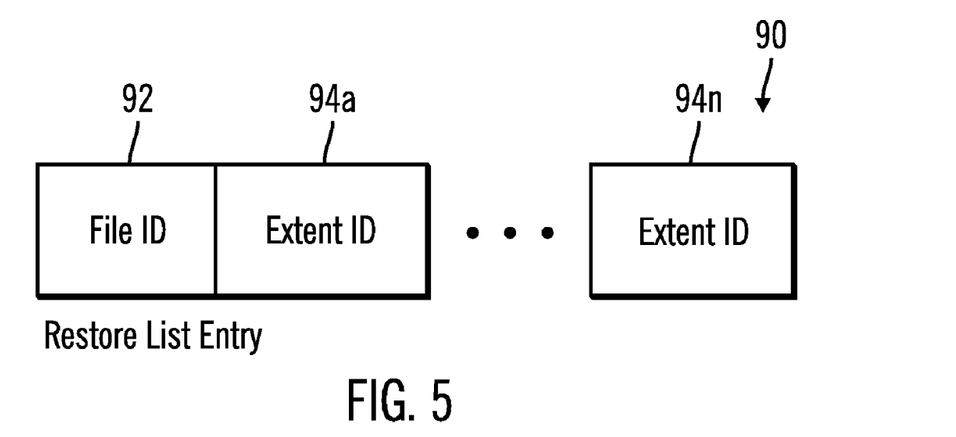
FIG. 5 illustrates an embodiment of a restore list entry in a restore list.

FIG. 5 illustrates an embodiment of an entry 90 in the restore list 20 indicating a file ID 92 of a file to restore and one or more extent IDs 94a ... 94n for each extent in the file stored in the sequential access device 18a, 18b, 18c.

Figure 6:
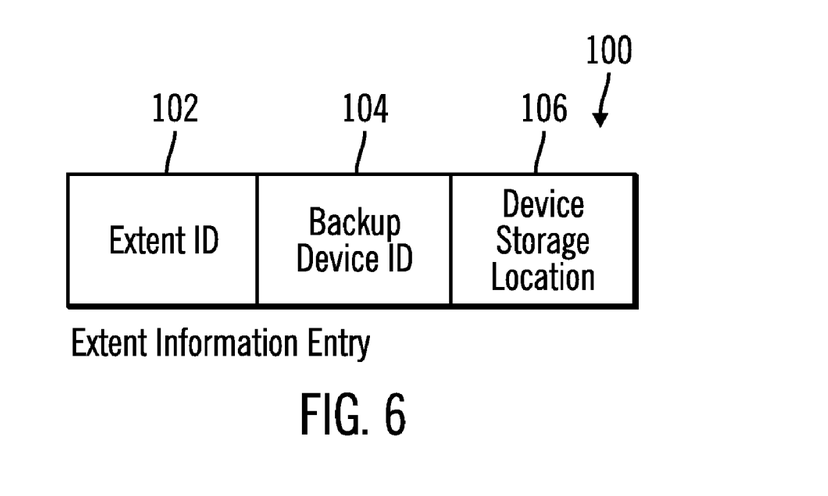
FIG. 6 illustrates an embodiment of extent information.

FIG. 6 illustrates an embodiment of extent information 100 the server backup program 10 maintains that indicates an extent identifier (ID) 102 for extents in the data objects to restore, a backup device ID 104 of a sequential backup device 18a, 18b, 18c including the extent 102, and a device storage location 106 indicating the block or location in the sequential backup device 104 having the extent. There is one entry 100 for each extent in the data objects, so an extent included in multiple data objects would only have one entry 100 in the extent information 22 indicating the location in the sequential backup device 18a, 18b, 18c of the extent.

The data presented in the data structures shown in FIGS. 2-6 may be stored in different formats and arrangements than shown in FIGS. 2-6, such as stored in different combinations of data structures having different combinations of fields and other information.

Figure 7:
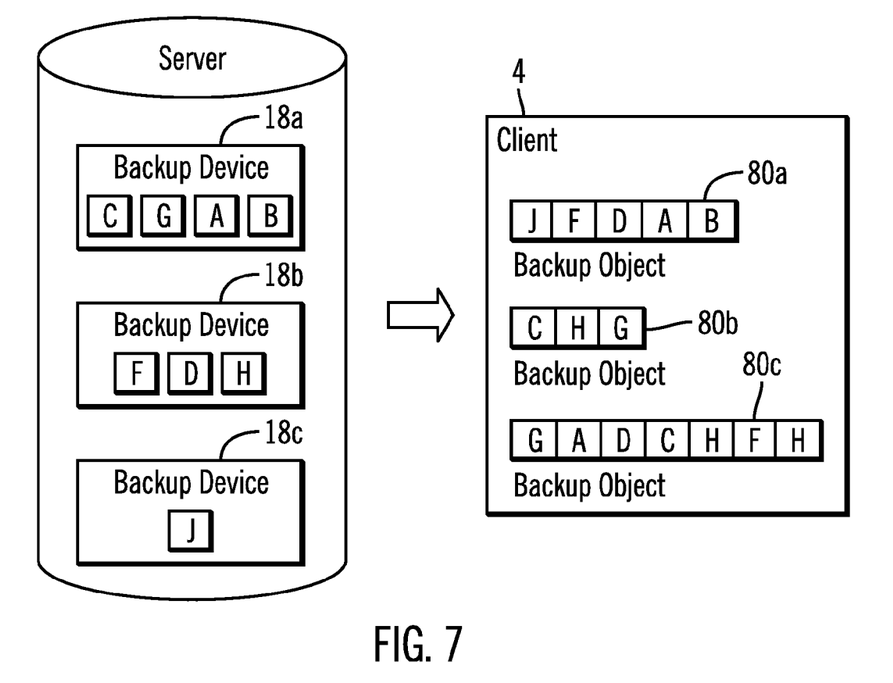
FIG. 7 illustrates an example of how the backup server maintains extents in backup devices for backup objects maintained by the client.

FIG. 7 illustrates an example of how the server 4 has three sequential backup devices 18a, 18b, 18c that have only one instance of extents C, G, A, B, F, D, H, J if deduplication is used. The client 4 has backup objects 80a, 80b, 80c comprised of extents backed-up in the backup devices 18a, 18b, 18c. The backup database 16 provides backup object information 70 (FIG. 3) for the backup objects 80a, 80b, 80c. The backup objects 80a, 80b, 80c may share extents. Further, there could be multiple instances of an extent in the same backup object. For instance, backup objects 80b and 80c have common extents C, H, and G, and backup objects 80a and 80c have common extents A, D, F. Data object 80c has two instances of extent H. In embodiments where deduplication is used to avoid storing multiple instances of a same extent, although the client 4 may maintain backup objects 80a, 80b, 80c having common extents, when those extents are backed-up in the backup devices 18a, 18b, 18c, deduplication provides only one instance of each extent stored in the backup devices 18a, 18b, 18c.

Figure 8:
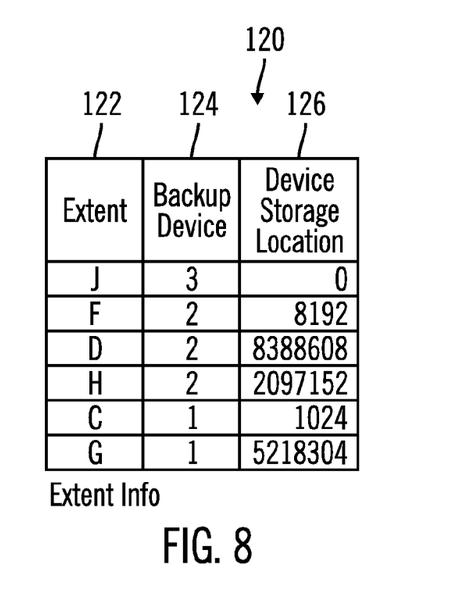
FIG. 8 illustrates an example of extent information.

FIG. 8 illustrates an example of extent information 120, comprising an example of the extent information 22 (FIG. 1), for the backup object example of FIG. 7, which has an extent column 122 having one instance of each extent, a backup device column 124 indicating the sequential backup device 18a, 18b, 18c including the extent, and a device storage location column 126 having the address or location of the extent on the backup device 124. The extent information 22 is sorted according to backup device column 124 and the device storage location 126 address, to indicate the backup devices 18a, 18b, 18c and storage locations having the extents in the backup objects to restore.

Figure 9:
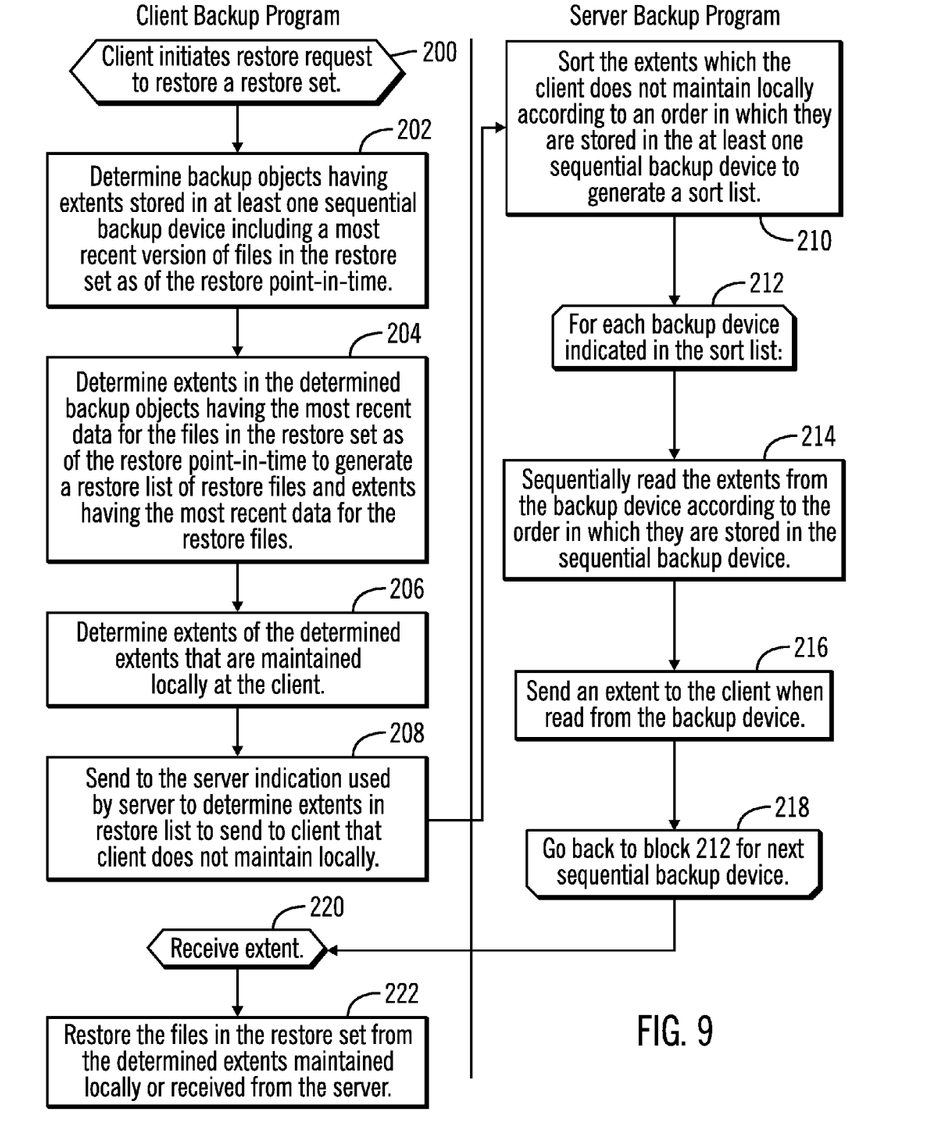
FIG. 9 illustrates an embodiment of operations to restore a restore set of files from extents in backup objects.

FIG. 9 illustrates an embodiment of operations performed by the server backup program 10 and client backup program 8 to restore a restore set of data maintained in backup objects whose extents are stored in the sequential backup devices 18a, 18b, 18c. The client backup program 8 (at block 200) initiates a restore request to restore a restore set as of a restore point-in-time. The restore set may comprise a full volume 12 or a subset of files in the volume 12. The client backup program 8 determines (at block 202) backup objects whose extents are stored in at least one sequential backup device 18a, 18b, 18c providing a most recent version of files in the restore set as of the restore point-in-time. The client backup program 8 determines (at block 204) extents in the determined backup objects having the most recent data for the files in the restore set as of the restore point-in-time to generate a restore list 20 of restore files and extents having the most recent data for the restore files.

The client backup program 8 may further determine (at block 206) extents indicated in the restore list 20 that are maintained locally at the client storage 14. The client backup program 8 sends (at block 208) to the server 4 indication of extents, which the server 4 uses to determine the extents to send to the client 2, which does not include the extents the client 2 maintains locally in local storage 14. In one embodiment, the client backup program 8 may send the server 4 a list of those extents maintained locally or a list of the extents in the backup objects to restore that the client 2 does not maintain locally.

Upon the server backup program 10 receiving the indication used to determine extents the client does not maintain locally that are needed to restore the restore set of files, the server backup program 10 sorts (at block 210) the extents that the client does not maintain locally according to an order in which they are stored in the at least one sequential backup device 18a, 18b, 18c to generate a sort list 24. The sort list 24 provides a plan for the server backup program 10 to sequentially access extents from the sequential backup devices 18a, 18b, 18c. In an alternative embodiment, the client backup program 8 may generate the sort list 24. The server backup program 10 then performs a loop of operations at blocks 212 through 218 for each backup device indicated in the sort list 24. For each backup device 18a, 18b, 18c, the server backup program 10 sequentially reads (at block 214) the extents in the sort list 24 from the sequential backup device 18a, 18b, 18c according to the order in which they are stored in the sequential backup device, as indicated in the sort list 24. The server backup program 10 may send (at block 216) extents to the client 4 as they are read from the sequential backup device 18a, 18b, 18c.

In one embodiment, upon receiving (at block 220) an extent from the server 4, the client backup program 8 may restore (at block 222) the files in the restore list 22 from the extents indicated in the list 22 that are maintained locally or received from the server. In one embodiment, the client backup program 8 may restore files from extents as the extents are received either from the server 4 or retrieved locally from the storage 14.

In an alternative embodiment, the client backup program 8 may gather extents received from the server 4 and retrieved locally in a buffer, such that the files are restored after all extents having the files to restore are available in the buffer.

Figure 10:
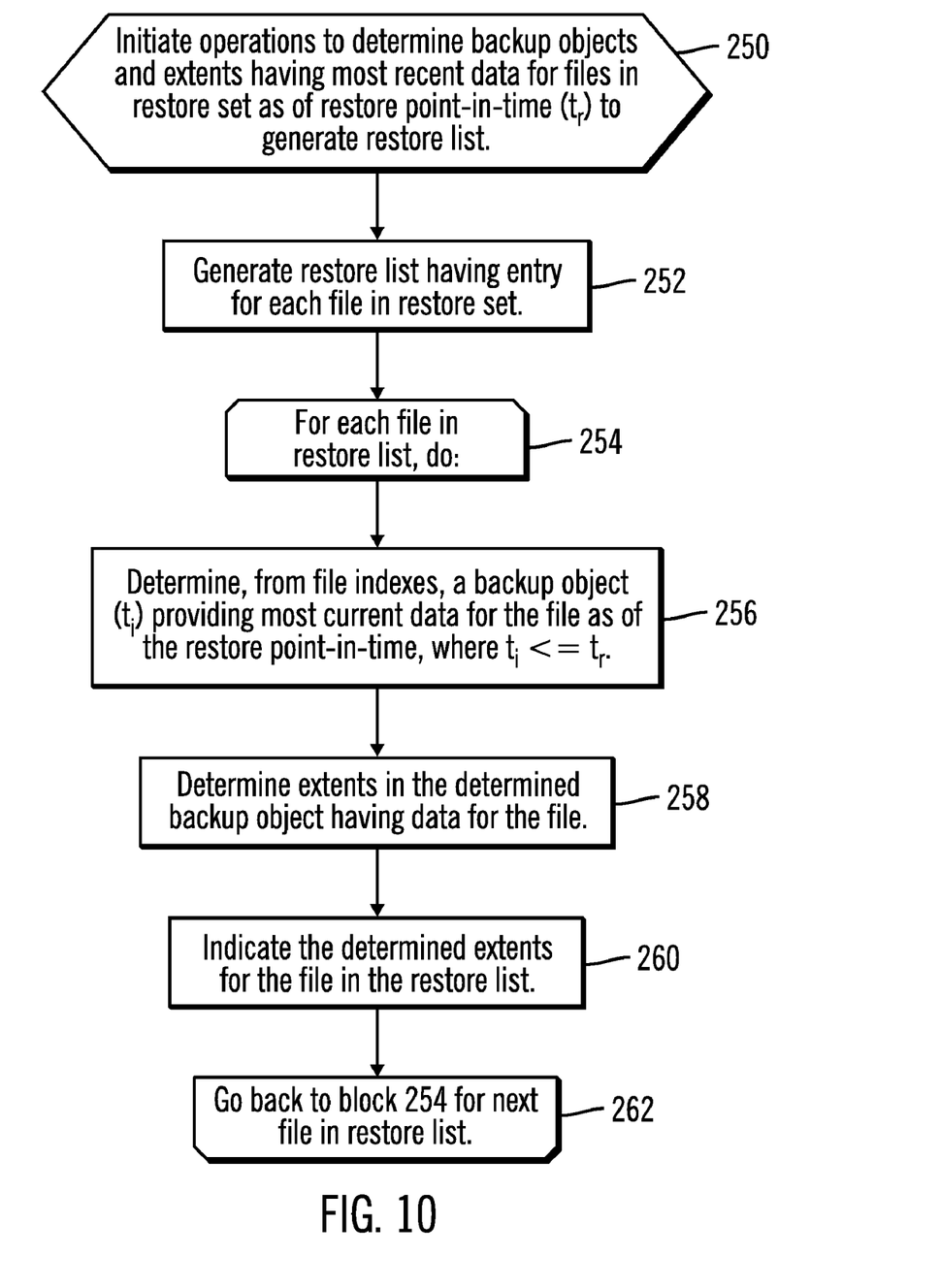
FIG. 10 illustrates an embodiment of operations to determine backup objects and extents from which to restore a restore set.

FIG. 10 illustrates an embodiment of operations performed to determine backup objects and extents having the most recent data for files to restore, such as performed at blocks 202 and 204 in FIG. 9. Upon initiating (at block 250) operations to determine backup objects and extents having most recent data for files in the restore set as of the restore point-in-time ($t_r$) to generate the restore list 20, the client backup program 8 (or server backup program 10) generates (at block 252) a restore list 20 having an entry for each file in the restore set, which can be the full volume or a subset of files in the volume. A loop of operations are performed at blocks 254-262 for each file indicated in a file index entry 80 (FIG. 4) in the restore list 20. At block 256, the client backup program 8 determines, from the file indexes 76, a backup object ($t_i$), having data as of point-in-time $t_i$, providing most current data for the file as of the restore point-in-time, where $t_i <= t_r$. The client backup program 8 determines (at block 258) the extents in the determined backup object having data for the file. For instance, the file index entry 80 in the file index 76 of the determined backup object would indicate the extents 84 having the data for that file in the determined backup object. The determined extents for the file are indicated (at block 260) in field 94 in the restore list entry 90 (FIG. 5) for the file in the restore list 20.

In certain embodiments, the client backup program 8 was described as performing the operations to determine the extents in the backup objects having the most recent data for a file to restore and generate the restore list 20, such as steps 202, 204, 206, and 208 in FIG. 9 and the operations in FIG. 10. In further embodiments, these operations to determine the backup objects and extents having the data for files to restore may be performed by the server backup program 10 from a backup database 16 maintained at the server 4 in response to a restore request from the client backup program 8. If the server backup program 10 performs the operations of FIG. 10, then the server may use the extent information 22 maintained locally to perform the operations of FIG. 10. In such embodiments, the server backup program 10 may provide the client backup program 8 the restore list 20 to use to restore the data for the files in the restore set from the extents received from the server.

Described embodiments provide techniques to restore a restore set of files in a volume from backup objects having a full volume backup and delta backups providing backups of the data at different points in time, where the extents for the backup objects are stored in sequential backup devices to optimize sequential retrieval of the extents from the sequential backup devices in embodiments. Backup objects having data at different points-in-time have the extents stored in non-contiguous locations in the extents in the sequential backup devices. Further, fragmentation in the volume may result in files being stored non-contiguously. Described embodiments optimize the retrieval of data from sequential backup devices to retrieve the extents having the files to restore in a sequential manner.

Further, the described embodiments optimize retrieval of extents from the sequential backup device in embodiment where deduplication is used to store the extents of the backup objects so that only one instance of an extent maintained in multiple backup objects is backed-up in the sequential backup devices 18a, 18b, 18c. Deduplication optimizes storage by only backing-up one instance of an extent and optimizes network bandwidth by only transmitting one instance of an extent even if that extent is included in multiple backup objects the client 2 is restoring from the backup server 4 over the network.

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In certain embodiments, the system of FIG. 1 may be implemented as a cloud component part in a cloud computing environment. In the cloud computing environment, the systems architecture of the hardware and software components involved in the delivery of cloud computing may comprise a plurality of cloud components communicating with each other over a network, such as the Internet. For example, in certain embodiments, the server 4 of FIG. 1 may provide hosts and clients backup services in a network cloud.

Figure 11:
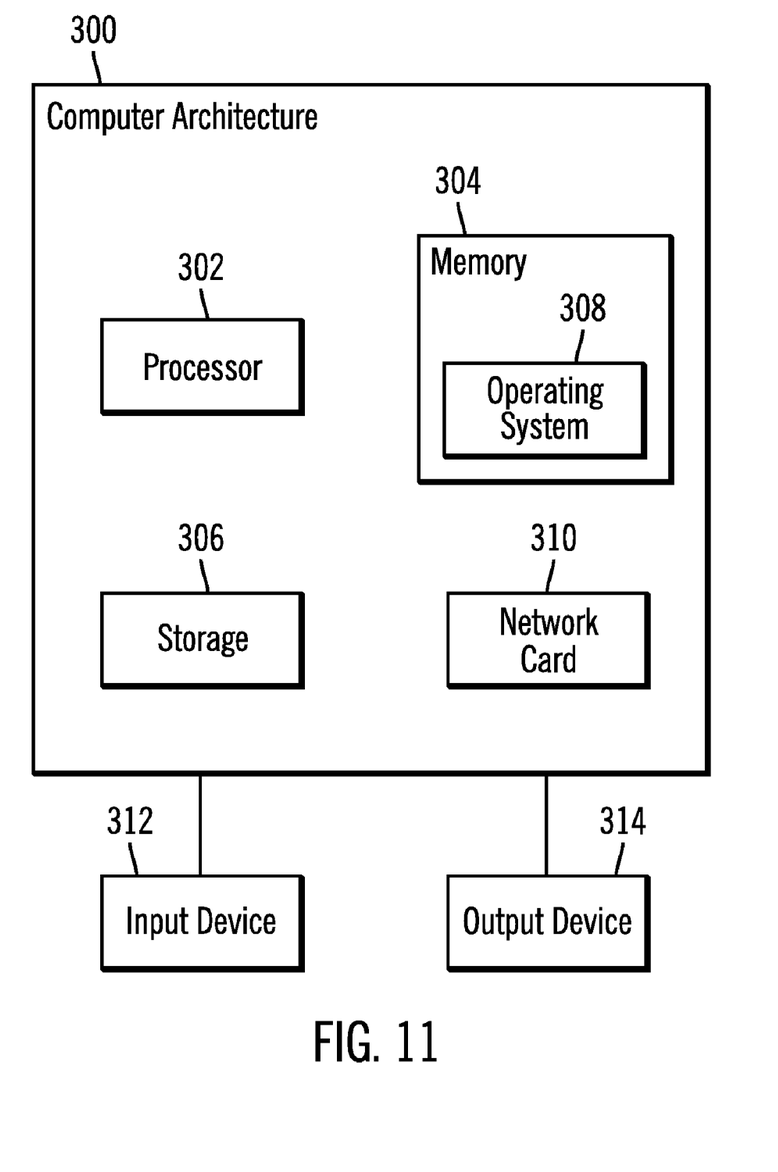
FIG. 11 illustrates an embodiment of a computer architecture.

FIG. 11 illustrates an embodiment of a computer architecture 300 that may be implemented at the client 2 and server 4 in FIG. 1. The architecture 300 may include a processor 302 (e.g., a microprocessor), a memory 304 (e.g., a volatile memory device), and storage 306 (e.g., a non-volatile storage, such as magnetic disk drives, optical disk drives, a tape drive, etc.). The storage 306 may comprise an internal storage device or an attached or network accessible storage. Programs, including an operating system 308 and the backup programs 8 and 10 in the storage 306 are loaded into the memory 304 and executed by the processor 302. The memory 304 may further include data structures, such as information 16, 20, 22, and 24. The architecture further includes a network card 310 to enable communication with the network 30. An input device 312 is used to provide user input to the processor 302, and may include a keyboard, mouse, pen-stylus, microphone, touch sensitive display screen, or any other activation or input mechanism known in the art. An output device 314 is capable of rendering information transmitted from the processor 302, or other component, such as a display monitor, printer, storage, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 9 and 10 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for restoring data from backup objects stored in at least one sequential backup device, the computer program product comprising a computer readable storage medium having computer readable program code embodied therein that executes to perform client and server operations, the operations comprising:
    initiating, by a client, a restore request to restore a restore set of data in a volume as of a restore point-in-time;
    determining backup objects stored in at least one sequential backup device including the restore set of data for the restore point-in-time, wherein the determined backup objects are determined from a set of backup objects including a full volume backup and delta backups providing data in the volume at different points-in-time, and wherein extents in different backup objects providing data for blocks in the volume at different points-in-time are not stored contiguously in the sequential backup device;
    determining extents stored in the at least one sequential backup device for the determined backup objects;
    sorting the determined extents according to an order in which they are stored in the at least one sequential backup device to generate a sort list;
    retrieving, by the server, the extents from the at least one sequential backup device according to the order in the sort list to access the extents sequentially from the sequential backup device in the order in which they were stored;
    returning, by the server, the retrieved extents to the client; and
    reconstructing, by the client, the restore data set from the received extents.

2. The computer program product of claim 1, wherein the determined backup objects are stored in a plurality of sequential access devices, wherein the sorting of the extents in the sort list is performed for each of the sequential backup devices including extents for the requested backup objects to produce one sort list for each of the sequential backup devices, and wherein the retrieving comprises retrieving all the extents for each of the sequential backup devices according to the order in the sort list for the sequential backup device to access the extents sequentially in the sequential backup device according to the order in which they were written to the sequential backup device.

3. The computer program product of claim 1, wherein the storing of the backup objects in the sequential backup devices only stores one instance of an extent, wherein at least two of the determined backup objects include at least one common extent, and wherein the returned extents include only one instance of the at least one common extent included in the at least two determined backup objects.

4. The computer program product of claim 3, wherein the server or client performs the operations of determining the backup objects comprising the restore set and determining the extents for the determined backup objects, wherein the operations further comprise
    determining, by the client, the determined extents that are maintained locally at the client; and
    sending, by the client, to the server indication of extents in the requested backup objects not maintained locally at the client, wherein the server returns the indicated extents to the client that the client does not maintain locally, and wherein the client reconstructs the restore set from the extents received from the server and the extents in the requested backup objects maintained locally at the client.

5. The computer program product of claim 1, wherein the operations further comprise:
    providing, for each backup object having a point-in-time, a file index of files in the volume that indicates whether the backup object provides data at the point-in-time for each of the files indicated in the index, and wherein the file index indicates at least one extent in the backup object having data for the files for which the backup object provides data.

6. The computer program product of claim 5,
    wherein the restore set comprises a subset of files in the volume; and
    wherein determining the backup objects comprises determining from the file indexes in the backup objects, backup objects for a full backup volume only, one or more delta backups or a full backup volume in combination with one or more delta backups that provide most current data for the files in the restore set as of the restore point-in-time.

7. The computer program product of claim 6, wherein determining the extents comprises determining the extents from the file indexes in the determined backup objects that provide most current data as of the restore point-in-time for the files in the restore set.

8. The computer program product of claim 5,
    wherein the restore set comprises the full volume,
    wherein determining the backup objects comprises determining from the file indexes in the backup objects, backup objects for a full volume backup only or a full backup volume in combination with one or more delta backups that provide most current data for all files in the volume as of the restore point-in-time, and
    wherein determining the extents comprises determining from the file indexes in the determined backup objects the extents that provide most current data as of the restore point-in-time for the files in the volume.

9. A system in communication with a client and at least one sequential backup device, comprising:
    a processor;
    a computer readable storage medium including code executed by the processor to perform operations, the operations comprising:

receiving, from the client, a restore request to restore a restore set of data in a volume as of a restore point-in-time;

determining backup objects stored in at least one sequential backup device including the restore set of data for the restore point-in-time, wherein the determined backup objects are determined from a set of backup objects including a full volume backup and delta backups providing data in the volume at different points-in-time, and wherein extents in different backup objects providing data for blocks in the volume at different points-in-time are not stored contiguously in the sequential backup device;

determining extents stored in the at least one sequential backup device for the determined backup objects;

sorting the determined extents according to an order in which they are stored in the at least one sequential backup device to generate a sort list;

retrieving, by the server, the extents from the at least one sequential backup device according to the order in the sort list to access the extents sequentially from the sequential backup device in the order in which they were stored; and returning, by the server, the retrieved extents to the client, wherein the client reconstructs the restore data set from the received extents.

10. The system of claim 9, wherein the requested data objects are stored in a plurality of sequential backup devices, wherein the sorting of the extents in the sort list is performed for each of the sequential backup devices including extents for the requested data objects to produce one sort list for each of the sequential backup devices, and wherein the retrieving comprises retrieving all the extents for each of the sequential backup devices according to the order in the sort list for the sequential backup device to access the extents sequentially in the sequential backup device according to the order in which they were written to the sequential backup device.

11. A system in communication with at least one sequential backup device, comprising:

a client having a client backup program;

a server having a server backup program, wherein the server is in communication with the client;

wherein the client backup program is executed to initiate a restore request to restore a restore set of data in a volume as of a restore point-in-time;

wherein the server backup program is executed to perform:

determining backup objects stored in at least one sequential backup device including the restore set of data for the restore point-in-time, wherein the determined backup objects are determined from a set of backup objects including a full volume backup and delta backups providing data in the volume at different points-in-time, and wherein extents in different backup objects providing data for blocks in the volume at different points-in-time are not stored contiguously in the sequential backup device;

determining extents stored in the at least one sequential backup device for the determined backup objects;

sorting the determined extents according to an order in which they are stored in the at least one sequential backup device to generate a sort list;

retrieving, by the server, the extents from the at least one sequential backup device according to the order in the sort list to access the extents sequentially from the sequential backup device in the order in which they were stored;

returning, by the server, the retrieved extents to the client; and wherein the client backup program is further executed to reconstruct the restore data set from the received extents.

12. The system of claim 11, wherein the storing of the backup objects in the sequential backup devices only stores one instance of an extent, wherein at least two of the determined backup objects include at least one common extent, and wherein the returned extents include only one instance of the at least one common extent included in the at least two determined backup objects.

13. The system of claim 12, wherein the server backup program or client backup program performs the operations of determining the backup objects comprising the restore set and determining the extents for the determined backup objects, wherein the client backup program is executed to further perform:

determining the determined extents that are maintained locally at the client; and sending to the server indication of extents in the requested backup objects not maintained locally at the client, wherein the server returns the indicated extents to the client that the client does not maintain locally, and wherein the client reconstructs the restore set from the extents received from the server and the extents in the requested backup objects maintained locally at the client.

14. The system of claim 11, wherein the backup server program is further executed to provide, for each backup object having a point-in-time, a file index of files in the volume that indicates whether the backup object provides data at the point-in-time for each of the files indicated in the index, and wherein the file index indicates at least one extent in the backup object having data for the files for which the backup object provides data.

15. The system of claim 14, wherein the restore set comprises a subset of files in the volume; and wherein determining, by the client backup program, the backup objects comprises determining from the file indexes in the backup objects, backup objects for a full backup volume only, one or more delta backups or a full backup volume in combination with one or more delta backups that provide most current data for the files in the restore set as of the restore point-in-time.

16. The system of claim 15, wherein determining the extents comprises determining the extents from the file indexes in the determined backup objects that provide most current data as of the restore point-in-time for the files in the restore set.

17. The system of claim 15, wherein the restore set comprises the full volume, wherein determining the backup objects comprises determining from the file indexes in the backup objects, backup objects for a full backup volume only or a full backup volume in combination with one or more delta backups that provide most current data for all files in the volume as of the restore point-in-time, and wherein determining the extents comprises determining from the file indexes in the determined backup objects the extents that provide most current data as of the restore point-in-time for the files in the volume.

18. A method, comprising:

storing backup objects in at least one sequential backup device;

initiating, by a client, a restore request to restore a restore set of data in a volume as of a restore point-in-time;

determining backup objects stored in at least one sequential backup device including the restore set of data for the restore point-in-time, wherein the determined backup objects are determined from a set of backup objects including a full volume backup and delta backups providing data in the volume at different points-in-time, and wherein extents in different backup objects providing data for blocks in the volume at different points-in-time are not stored contiguously in the sequential backup device;

determining extents stored in the at least one sequential backup device for the determined backup objects;

sorting the determined extents according to an order in which they are stored in the at least one sequential backup device to generate a sort list;

retrieving, by a server, the extents from the at least one sequential backup device according to the order in the sort list to access the extents sequentially from the sequential backup device in the order in which they were stored;

returning, by the server, the retrieved extents to the client; and reconstructing, by the client, the restore data set from the received extents.

19. The method of claim 18, wherein the determined backup objects are stored in a plurality of sequential access devices, wherein the sorting of the extents in the sort list is performed for each of the sequential backup devices including extents for the requested backup objects to produce one sort list for each of the sequential backup devices, and wherein the retrieving comprises retrieving all the extents for each of the sequential backup devices according to the order in the sort list for the sequential backup device to access the extents sequentially in the sequential backup device according to the order in which they were written to the sequential backup device.

20. The method of claim 18, wherein the storing of the backup objects in the sequential backup devices only stores one instance of an extent, wherein at least two of the determined backup objects include at least one common extent, and wherein the returned extents include only one instance of the at least one common extent included in the at least two determined backup objects.

21. The method of claim 20, wherein the operations further comprise determining, by the client, the determined extents that are maintained locally at the client; and sending, by the client, to the server indication of extents in the requested backup objects not maintained locally at the client, wherein the server returns the indicated extents to the client that the client does not maintain locally, and wherein the client reconstructs the restore set from the extents received from the server and the extents in the requested backup objects maintained locally at the client.

22. The method of claim 18, further comprising:

providing, for each backup object having a point-in-time, a file index of files in the volume that indicates whether the backup object provides data at the point-in-time for each of the files indicated in the index, and wherein the file index indicates at least one extent in the backup object having data for the files for which the backup object provides data.

23. The method of claim 22, wherein the restore set comprises a subset of files in the volume; and wherein determining the backup objects comprises determining from the file indexes in the backup objects, backup objects for a full backup volume only, one or more delta backups or a full backup volume in combination with one or more delta backups that provide most current data for the files in the restore set as of the restore point-in-time.

24. The method of claim 23, wherein determining the extents comprises determining the extents from the file indexes in the determined backup objects that provide most current data as of the restore point-in-time for the files in the restore set.

25. The method of claim 22, wherein the restore set comprises the full volume, wherein determining the backup objects comprises determining from the file indexes in the backup objects, backup objects for a full backup volume only or a full backup volume in combination with one or more delta backups that provide most current data for all files in the volume as of the restore point-in-time, and wherein determining the extents comprises determining from the file indexes in the determined backup objects the extents that provide most current data as of the restore point-in-time for the files in the volume.

* * * * *